(12) United States Patent
Habusha et al.

(10) Patent No.: US 9,928,207 B1
(45) Date of Patent: Mar. 27, 2018

(54) GENERATING TRANSACTIONS WITH A CONFIGURABLE PORT

(71) Applicant: Amazon Technologies, Inc., Seattle, WA (US)

(72) Inventors: Adi Habusha, Moshav Alonei Abba (IL); Nafea Bshara, San Jose, CA (US); Itay Poleg, Haifa (IL); Erez Izenberg, Tel-Aviv (IL); Guy Nakibly, Kedumim (IL); Matthew Shawn Wilson, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 168 days.

(21) Appl. No.: 14/869,107

(22) Filed: Sep. 29, 2015

(51) Int. Cl.
*G06F 13/00* (2006.01)
*G06F 13/42* (2006.01)
*G06F 13/40* (2006.01)
*G06F 13/38* (2006.01)

(52) U.S. Cl.
CPC ........ *G06F 13/4282* (2013.01); *G06F 13/385* (2013.01); *G06F 13/404* (2013.01); *G06F 13/4022* (2013.01); *G06F 13/4221* (2013.01)

(58) Field of Classification Search
CPC .................................................. G06F 3/1454
See application file for complete search history.

(56) References Cited

U.S. PATENT DOCUMENTS

| | | | | |
|---|---|---|---|---|
| 6,189,063 | B1* | 2/2001 | Rekeita | G06F 13/4027 370/402 |
| 7,107,382 | B2* | 9/2006 | Clayton | G06F 13/385 710/22 |
| 8,751,713 | B2* | 6/2014 | Ayzenfeld | G06F 13/105 710/104 |

* cited by examiner

*Primary Examiner* — Henry Tsai
*Assistant Examiner* — Juanito Borromeo
(74) *Attorney, Agent, or Firm* — Kilpatrick Townsend & Stockton LLP

(57) ABSTRACT

Provided are systems and methods for generating transactions with a configurable port. In some implementations, a peripheral device is provided. The peripheral device comprises a configurable port. In some implementations, the configurable port may be configured to receive a first transaction. In these implementations, the first transactions may include an address. The address may include a transaction attribute. In some implementations, the configurable port may extract the transaction attribute and a transaction address from the address. The configurable port may further generate a second transaction that includes the transaction attribute and the transaction address. The configurable port may also transmit the second transaction.

20 Claims, 10 Drawing Sheets

GENERATING TRANSACTIONS WITH A CONFIGURABLE PORT

BACKGROUND

Computing systems may include peripheral devices. Peripheral devices may add to or change the functionality of the computing system. In many cases, peripheral devices are connected to the computing system using an interconnect. The interconnect may implement a standard bus protocol, such as any of the Peripheral Component Interconnect (PCI) family of bus protocols. Transactions transferred over the interconnect typically include at least an address, designating a destination for the transaction. Write transactions may also include data to write to the address. With some bus protocols, transactions may also include attributes. Attributes provide additional information about a transaction.

BRIEF DESCRIPTION OF THE DRAWINGS

Various embodiments in accordance with the present disclosure will be described with reference to the drawings, in which.

DETAILED DESCRIPTION

Figure 1:
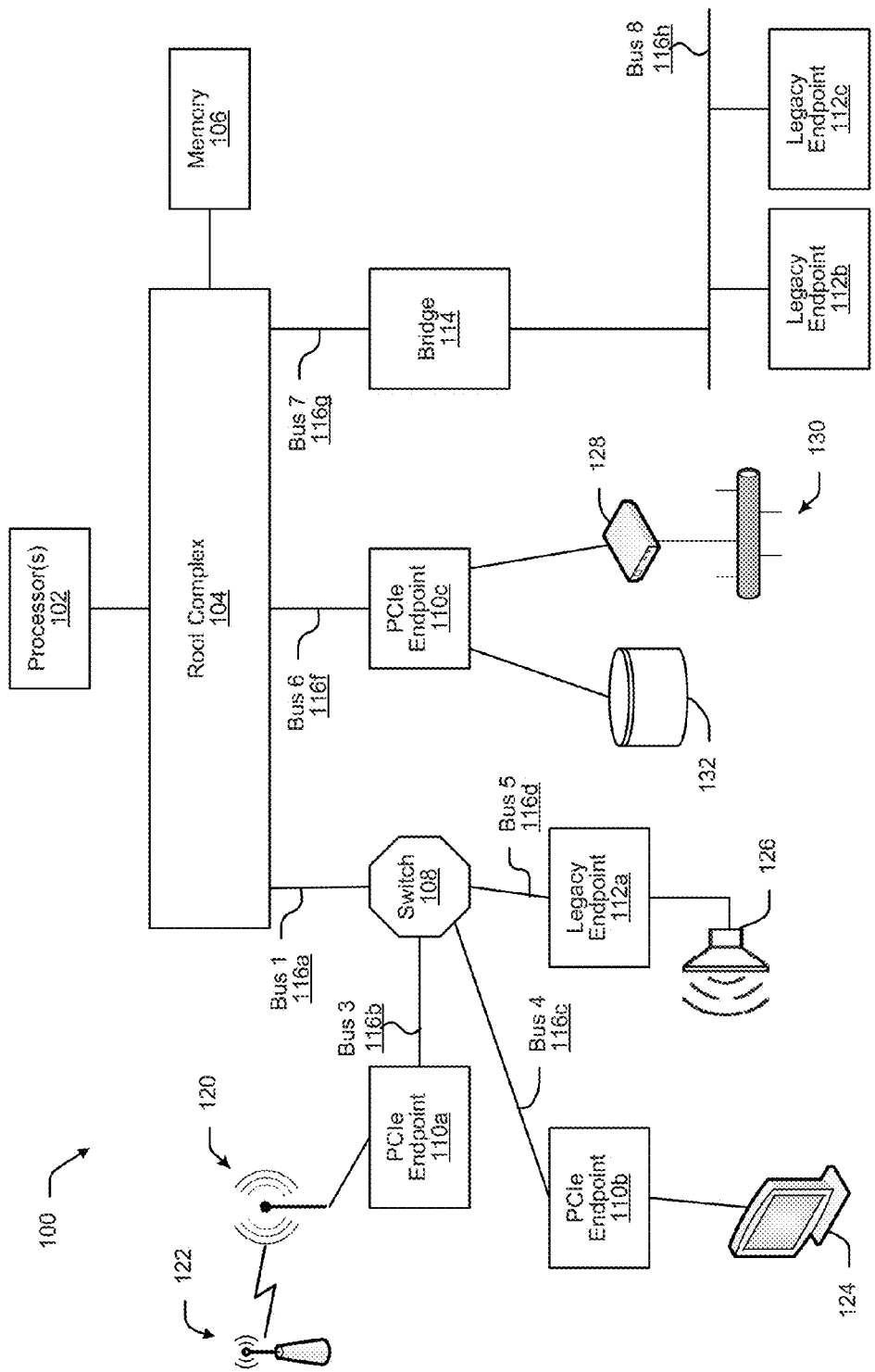
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computing systems may include peripheral devices. Peripheral devices may add to or change the functionality of the computing system. Examples of peripheral devices include storage devices, displays, speakers, and wired and/or wireless network adapters. In many cases, peripheral devices are connected to the computing system using an interconnect. The interconnect may implement a standard bus protocol, such as any of the PCI family of bus protocols. Transactions transferred over the interconnect typically include at least an address, designating a destination for the transaction. Write transactions may also include data to write to the address. With some bus protocols, transactions may also include attributes. Attributes provide additional information about a transaction. For example, attributes may identify the requester of a transaction, or may indicate how a transaction should be handled.

In some implementations, a peripheral device may be configured to generate transaction attributes internally. For example, the functions implemented by a PCI device may generate a transaction internal to the PCI device that includes attributes. In many cases, however, for a function to generate internal transactions that include attributes, the function may have to be a PCI-specific component. A general purpose component would not support transaction attributes and thus could not be used in place of a PCI-specific function component. A virtualized PCI device presents one example where general purpose, off-the-shelf components may not be particularly unsuitable to build the device. In a virtualized PCI device, the functions generally need to provide both physical and virtual resources, and so are often purpose built.

The PCI device may also need a way to transfer the attributes from the functions to a port that connects the PCI device to the computing system. The PCI device may use an internal interconnect to connect the functions to the port. In many cases, it may be more practical and cost-effective to implement the internal interconnect with a standard bus protocol. A standard bus protocol, however, may not provide a way to transfer transaction attributes between a function and the PCI device's PCI port. In such cases, the PCI device may have to include a secondary or sideband bus to transfer attributes between its functions and its port.

A configurable port may provide a way for a peripheral device to be built with generic components, rather than purpose-built components. Transaction attributes may be encoded into internal transactions generated by the peripheral device's functions. In one implementation, a function may include a configuration register. The configuration register may be configured to include transaction attributes in transactions generated by the function. When the function generates a transaction, the transaction's address will automatically include the transaction attributes programmed into the configuration register. The configurable port may extract the transaction attributes, and use the transaction attributes and the internal transaction to generate an outgoing transaction.

Encoding attributes into the transaction may provide a way to transfer the attributes from an internal function to a port. Encoded attributes, together with a configurable port, may also provide a peripheral device that may be configured differently for different situations. In this way, a configurable and flexible peripheral device may be built.

The configurable port may also provide a flexible hardware implementation. In such implementations, the configurable port may be modified (for example, by updating its firmware) to accommodate changes in the outbound bus protocol, and/or to provide new or different functionality at the port. The hardware, however, need not be changed, and so the device may continue to be used even as the external bus standard changes.

FIG. 1 illustrates an example of a computing system 100 that includes multiple peripheral devices. Peripheral devices may include hardware devices and/or devices that include a combination of hardware and software that can be attached to a computing system to add functionality to the computing system 100. Examples of peripheral devices include storage devices, displays, speakers, wired and/or wireless network adapters, adapters to provide additional ports to the system (such as serial and/or parallel ports), and bridges, hubs, and/or switches that provide ports for additional peripheral devices, among others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standardized bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" may be used to describe any protocol in the PCI family of bus protocols. In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of busses, among others. The illustrated example can also be implemented with a combination of standardized bus protocols, proprietary bus protocols, and/or with a combination of standardized and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-c and legacy endpoints 12a-c. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102, and direct responses from the processors 102 back to the peripheral devices. The root complex 104 may further generate transactions on behalf of the processors 102, and forward responses to these transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors and memory.

The memory subsystem 106 provides temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read Only Memory (ROM), such as Programmable Read Only Memory (PROM), Erasable Programmable Read Only Memory (EPROM), Electrically Erasable Programmable Read Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, that is, peripheral devices that are configured to communicate using the PCIe protocol. Other peripheral devices may be legacy endpoints, that is, peripheral devices that are configured to communicate using other PCI protocols, such as the original PCI standard or PCI-X. Though not illustrated here, the computing system 100 may further include peripheral devices that implement another bus standard, such as for example Small Computer System Interface (SCSI), Serial ATA (SATA), or Parallel ATA (PATA), among others.

The switch 108 functions as a hub between various devices, including the root complex 104, peripheral devices, and possibly other switches and bridges. The switch 108 may route transactions between any of the devices connected to it. For example, the switch 108 may route transactions between the PCIe endpoints 110a-b and the legacy endpoint 112a, and between the various endpoints 110a-b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example the legacy endpoints 112b-c are connected to a shared PCI bus 116h. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 110a-c, form an example of a switching fabric. A switching fabric topology may include point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116f. Similarly, the bridge 114 is connected to the root complex with Bus 7 116g. Each of the PCIe endpoints 110a-b and the legacy endpoint 112a are also connected to the switch 108a with individual busses 116b-d. The connections between each of the root complex 104, the switch 108, the bridge 114, the PCIe endpoints 110a-c and the legacy endpoint 112a are point-to-point because each of the busses 116a-g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 108 (Bus 0 may be internal to the root complex 104). Similarly, each of the busses connecting the PCIe endpoints 110a-b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116f, while the connection between the root complex and the bridge 114 may be labeled Bus 7 116g. Finally, the shared bus downstream from the bridge 114 may be labeled Bus 8 116h. In most cases the numbers of the busses is arbitrary, though bus numbers may generally be assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the functionality of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the functionality of, for example, a network interface or a storage controller may be called a "function." Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. During an enumeration process, software executing on the processors 102 may first scan each of the busses 116a, 116f, 116g connected to the root complex 104, and identify the switch 108, the PCIe endpoint 110c, and the bridge 114. Upon discovering the switch 108, the processors 102 may next scan the busses 116b-d connected to the switch 108. The processors 102 thereby discover the PCIe endpoints 110a-c and the legacy endpoint 112a. Upon discovering the bridge 114, the processors 102 may also scan Bus 8 116h; however, the bridge 114 may translate the scanning instructions to the protocol implemented by Bus 8 116h.

While scanning the busses, or possibly after, the processors 102 may also transmit configuration transactions to each of the devices it discovers. Configuration may include, for example, assigning one or more address spaces. For example, PCI devices typically include one or more of a memory address space and/or an I/O address space. Each of these address spaces may be subdivided into multiple blocks. These address spaces, or address space blocks, may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

In some implementations, a peripheral device may include single-root I/O virtualization (SR-IOV). SR-IOV is an extended capability that may be included in a PCIe endpoint. SR-IOV allows a physical resource (e.g., a single network interface controller) to appear as multiple resources (e.g., sixty-four network interface controllers). Thus, a PCIe endpoint providing a certain functionality may appear to software executing on the processors 102 as multiple devices providing the same functionality. The functions of a SR-IOV-capable peripheral device may be classified as physical functions (PFs) or virtual functions (VFs). Physical functions are fully featured functions of the device that can be discovered, managed, and manipulated. Physical functions have configuration space that can be used to configure or control function. Physical functions include the same configuration address space and memory address space that a non-virtualized device would have. A physical function may have a number of virtual functions associated with the physical function. Virtual functions represent virtual versions of the underlying physical function. In most cases, virtual functions have no configuration space, or only a partial configuration space, and are generally controlled by the configuration of their underlying physical functions. In some implementations, each of the physical functions and/or virtual functions may be assigned to a respective thread of execution (such as, for example, a virtual machine) running on the one or more processors.

In many cases, a peripheral device can be built with readily available parts. For example, a manufacturer may be able to purchase hardware and/or software components that implement a mass storage device or a network interface controller. Similarly, the manufacturer may be able to purchase a component that provides a port that can connect the peripheral device to the bus or fabric provided by a computing system. For example, the manufacturer may build a PCI-compatible device by purchasing a PCI port component. Readily available components such as these may be referred to as Intellectual Property (IP). The manufacturer may, alternatively or additionally, design and build its own function and/or port components. The function components and the port may be connected inside the peripheral device using a standard or proprietary bus protocol. In some cases, however, the bus protocol provided by the computing system may require additional information that may not be provided by function components. For example, a PCI-compatible peripheral device may require that the function components provide transaction attributes in addition to basic transaction information.

Figure 2:
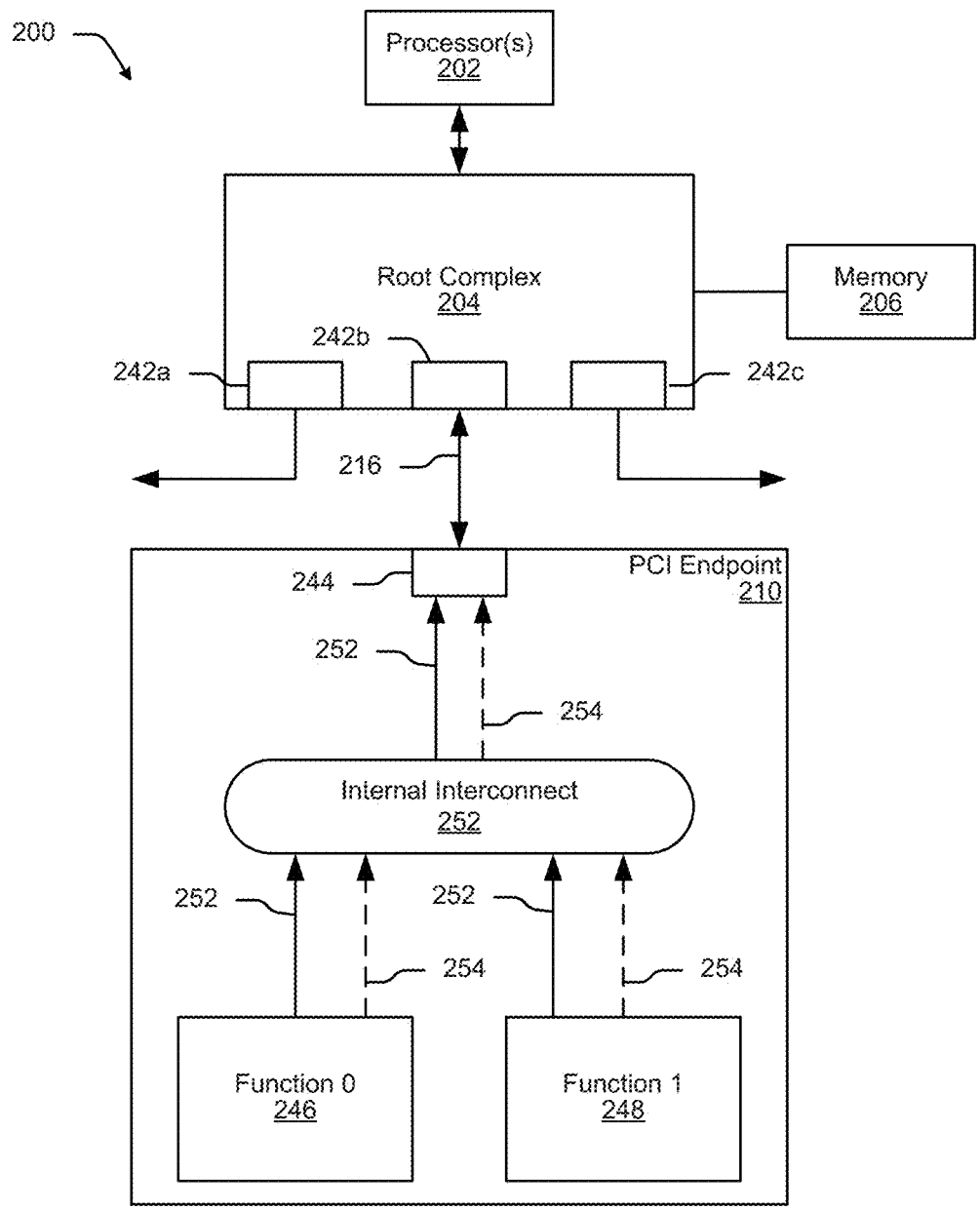
FIG. 2 illustrates an example of a computing system that includes at least one PCI endpoint.

FIG. 2 illustrates an example of a computing system 200 that includes at least one PCI endpoint 210. In this example, the PCI endpoint 210 is in communication with a root complex 204 over a PCI interconnect 216. In the example of FIG. 2, PCI is used as an example of a bus protocol that may be implemented by a computing system to connect to peripheral devices. It is understood that the example illustrated in FIG. 2 may apply to other bus protocols that may be used to connect peripheral devices to a computing system.

The processors 202 may be general purpose computing devices that are generally capable of executing software code. A processor may include multiple processing cores. The memory subsystem 206 provides temporary or long-term storage for data that may be used by the computing system 200.

The root complex 204 is a hardware or hardware and software device that connects processors 202 and a memory subsystem 206 to peripheral devices, such as the PCI endpoint 210. The root complex 204 may include multiple ports 242a-c. The ports 242a-c may be connected to peripheral devices, such as the PCI endpoint 210, or to switches or bridges. The root complex 204 may generate transactions and transaction responses on behalf of the processors 202, where those transactions and responses are directed to peripheral devices connected directly or indirectly to the ports 242a-c. The root complex 204 may further receive transactions and transaction responses at its ports 242a-c, and those forward transactions and responses to the processors 202.

The root complex 204 may communicate with the PCI endpoint 210 over a PCI interconnect 216. The interconnect 216 may be a physical connection that includes sockets or plugs, cables or wires, printed circuit boards, or a combination of any of these.

The PCI endpoint 210 in this example includes a port 244, two functions 246, 248, and an internal interconnect 252 that connects the functions 246, 248 to the port 244. The ports 244 may enable communication with the root complex 204 over the PCI interconnect 216.

The port 244 may include a physical interface for connecting to a cable, socket, port, or other connection to the PCI interconnect 216. The port 244 may further include hardware and/or software to manage incoming and outgoing transactions. For example, the port 244 may be configured to accept internal transactions from the functions 246, 248, where those internal transactions are formatted according to the internal interconnect 252. The port 244 may further translate those internal transactions into PCI transactions, and transmit the PCI transactions to the root complex 204 over the interconnect 216. The root complex 204 may further direct those PCI transactions to the processors 202, or, by way of the ports 242a, 242c, to other peripheral devices. Similarly, the port 244 may accept transactions from the root complex 204, and translate those transactions for transmission over the internal interconnect 252 to the functions 246, 248.

The PCI endpoint 210 in this example also includes two functions 246, 248. The functions 246, 248 include hardware and/or software that implement operations that may be provided by a peripheral device. For example, Function 0 246 may be a mass storage controller, and provide communication with one or more storage devices. As another example, Function 1 248 may be a network interface, and provide communication with a network. Two functions are provided as an example. In various implementations, a PCI endpoint may include only one functions, or more than two functions.

The functions 246, 248 may communicate with the port 244 over an internal interconnect 252. The internal interconnect 252 may be implemented using a standard bus protocol, such as Coherent Hub Interface (CHI), Advanced eXtensible Interface (AXI), Advanced High-Performance Bus (AHB), or the like. The internal interconnect 252 may also be implemented using a proprietary bus protocol. The protocols that may be implemented by the internal interconnect 252 typically define a transaction format. A transaction format typically includes at least an address, indicating the target of the transaction, and a transaction type, such as read or write. Write transactions may further include data. A transaction may include other information that either further identifies the target of the transaction, and/or provides further details about a data read or data write.

In some implementations, PCI transactions, such as may be generated by the port 244, may include additional information with each transaction. This additional information may generally be referred to as transaction attributes, or simply attributes. Attributes may, for example, identify the requester of a transaction. A requester may be identified, for example, by a bus number, device number, and/or function number. As another example, attributes may indicate how a transaction is supposed to be handled. For example, a transaction may be marked as no snoop, relaxed ordering, and/or cacheable. Other attributes may be defined. For example, a transaction may include "processing hints" that attempt to increase how quickly the transaction is processed. Processing hints may, for example, indicate that the address included with the transaction is frequently accessed. As another example, processing hints may indicate a processing resource that is being targeted by the requester.

In the PCI endpoint 210, the functions 246, 248 may include attributes with any internal transactions that the functions 246, 248 generate. The internal interconnect 252, however, may not provide an efficient way to pass these attributes with a transaction. For example, when the internal interconnect 252 is implemented using a standard bus protocol, the internal interconnect 252 may not have additional wires for transferring the attributes. In this example, the PCI endpoint 210 provides a secondary interconnect 254, so that attributes can be transferred to the port 244 at about the same time that an internal transaction is transferred. The port 244 may then generate a PCI transaction using information from both the internal transaction and any accompanying transaction attributes.

In PCI devices, the functions provide attributes with the internal transactions they generate. For this reason, in some implementations, a PCI device may generally be built with PCI-specific functions components, rather than generally available, off-the-shelf functions components. Virtualization provides one example where off-the-shelf components may be particularly difficult to use. A PCI device that includes virtualization (e.g., a PCI device that includes SR-IOV) may require that the functions provide resources for both their physical functions and for some number of virtual functions. Providing resources for the virtual functions may require additional hardware and/or software.

In some cases, it may be desirable to build a PCI device that can use readily available, off-the-shelf function components. In such cases, the PCI device may include a method to configure the off-the-shelf functions with transaction attributes. The PCI device may further provide a method to transfer attributes along with transactions from functions to the PCI port, for transmission onto a PCI interconnect.

I. Configurable Port

Figure 3:
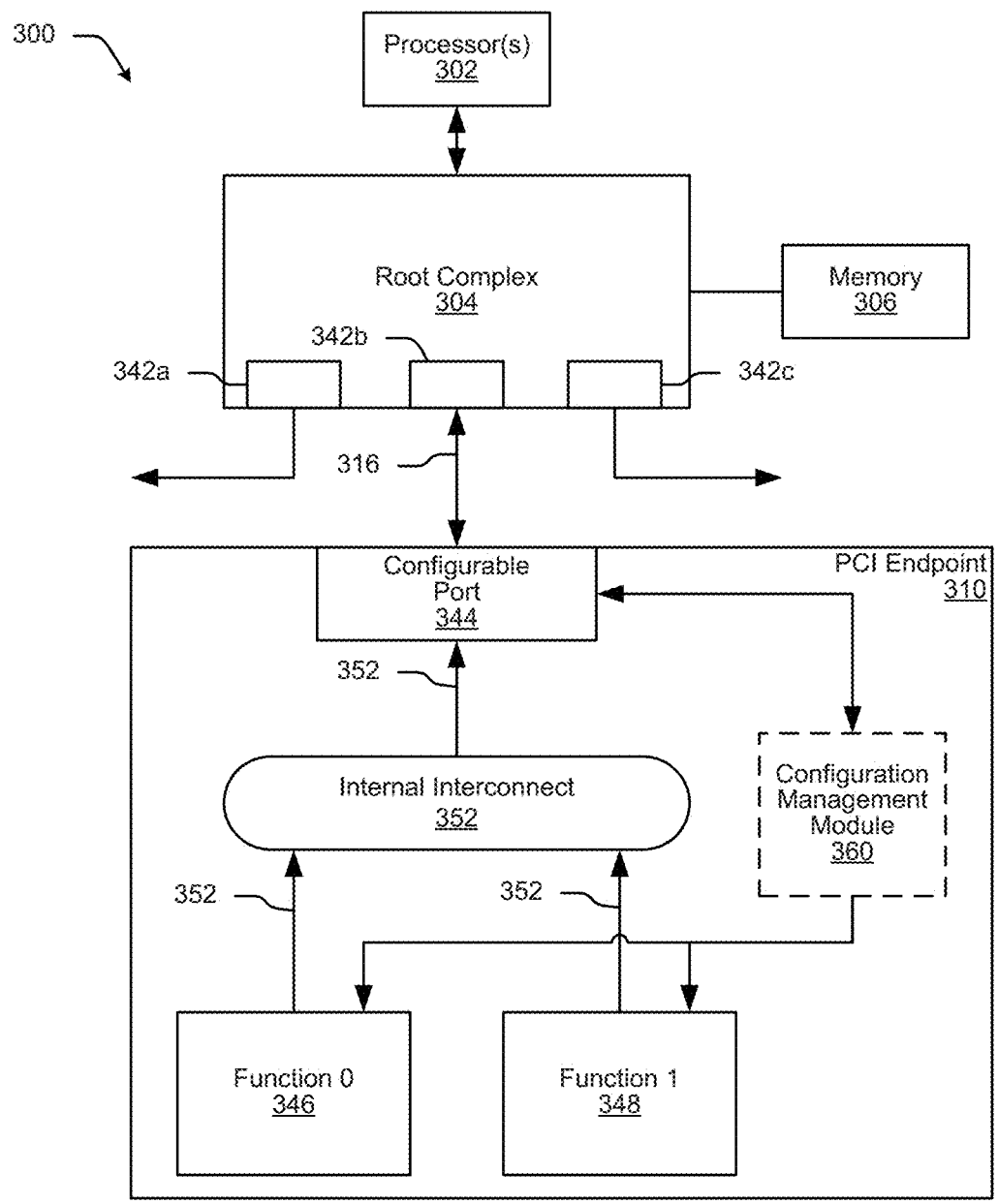
FIG. 3 illustrates an example of a computing system with a PCI endpoint that includes a configurable port.

FIG. 3 illustrates an example of a computing system 300 with a PCI endpoint 310 that includes a configurable port 344. In this example, the PCI endpoint 310 is in communication with a root complex 304 over a PCI interconnect 316. The root complex 304 may be in communication with one or more processors 302 and a memory subsystem 306. The root complex 304 may include one or more ports 342a-c. These ports 342a-c may be connected, using additional PCI interconnects, to PCI switches, bridges, and endpoints, including the illustrated PCI endpoint 310. The root complex 304 may route transactions between the processors 302 and any of the endpoints, switches, or bridges, or between the endpoints, switches, and bridges themselves. In this example, PCI is used as an example of a bus protocol that may be implemented by a computing system to connect to peripheral devices. It is understood that the example illustrated in FIG. 3 may apply to other bus protocols that may be used to connect peripheral devices to a computing system.

The processors 302 may be general purpose computing devices that are generally capable of executing software code. A processor may include multiple processing cores. The memory subsystem 306 provides temporary or long-term storage for data that may be used by the computing system 300.

The PCI endpoint 310 in this example includes a configurable port 344, two functions 346, 348, and an internal interconnect 352 that connects the functions 346, 348 to the configurable port 344. The PCI endpoint 310 may also include an optional configuration management module 360.

The configurable port 344 may include a physical interface for connecting to a cable, socket, port, or other connection to the PCI interconnect 316. The configurable port 344 may further include hardware and/or software to manage incoming and outgoing transactions. The configurable port 344 may translate an internal transaction from the functions 346, 348 into a PCI transaction for transmission over the PCI interconnect 316. The configurable port 344 may further translate transactions received over the PCI interconnect 316 for transfer over the internal interconnect 352 to the functions 346, 348. The configurable port 344 may also be configured to manage transaction attributes, as will be explained in further detail below.

The PCI endpoint 310 in this example includes two functions 346, 348. These functions may be similar to the functions 246, 248 illustrated in FIG. 2. That is, the functions 346, 348 of FIG. 3 may include hardware and/or software that implement operations (e.g., a mass storage controller or a network interface) that may be provided by a peripheral device. Alternatively or additionally, the functions 346, 348 may be generic function components (e.g., a generic mass storage controller) that are not specifically designed for use in a PCI endpoint 310. In various implementations, a PCI endpoint may include only one function, or more than two functions.

The functions 346, 348 may communicate with the configurable port 344 over an internal interconnect 352. The internal interconnect 352 may be implemented using a standard bus protocol, or may be implemented using a proprietary bus protocol.

As noted above, PCI transactions, such as may be generated by the configurable port 344, may include transaction attributes. These attributes are normally provided by the functions 346, 348. The functions 346, 348 in this example, however, may be generic, non-PCI components, and so may not be configured to generate the attributes. Instead, any desired attributes may be encoded into a portion of the transactions that may be generated by the functions 346, 348. For example, in one implementation, attributes may be encoded into bits of an address that is provided with a transaction. Using a portion of the transaction, such as address bits, also obviates the need for a secondary or sideband interconnect to transfer the attributes from the functions 346, 348 to the configurable port 344.

In most cases, attributes may be configured into to the functions 346, 348 using a mechanism provided by the function 346, 348 itself. For example, in one implementation, a function 346 may include one or more configuration registers. These configuration registers may control the operation of the function 346, and/or provide information about the function 346. For example, the function 346 may include a configuration register that can be programmed to include one or more attributes into the address of each transaction generated by the function 346. When the function 346 generates an internal transaction, the programmed attributes may be automatically inserted into bits of the transaction's address. This may be accomplished, for example, by connecting some of the bits of transaction address to bits of the configuration register, and/or masking bits from the configuration register. In most cases, the attributes are placed into bits of the address that would otherwise be set to zero.

In other implementations, a function may provide other mechanisms for configuring the address space or spaces assigned to the function. In some implementations, bits other than address bits may be used to encode one or more attributes.

Internal transactions, with any desired attributes, may be transferred from the functions 346, 348 to the configurable port 344 over the internal interconnect 352. Because the attributes may be encoded into the bits of the internal transactions, the internal interconnect 352 may be implemented with any standard bus protocol. The internal transactions may be formatted according to the internal bus protocol, and thus the PCI endpoint 310 should not require any changes to the internal bus protocol, nor require a secondary interconnect for transferring the transaction attributes.

The configurable port 344 may, upon receiving an internal transaction over the internal interconnect 352, extract the attributes from the transaction. The configurable port 344 may then generate a PCI transaction using the information provided by the internal transaction and the extracted attributes. In some cases, the configurable port 344 may remove the attribute bits from their embedded location in the internal transaction, prior to using the internal transaction to generate the PCI transaction. In other cases, removing the attribute bits first is not necessary. In some cases, a PCI transaction may include fields for each of the attributes, such as for example a requester identifier field, or an attribute field.

The configurable port 344 may also operate in the reverse direction. Upon receiving a transaction over the PCI interconnect 316, the configurable port 344 may place any attributes received with the inbound PCI transaction into the designated bits in an internal transaction. This may help the functions 346, 348 to identify and accept the internal transaction.

Table I illustrates several example configurations for encoding attributes into an internal transaction. In these examples, the attributes are encoded into the bits of a 64-bit address field. In the first example, a PCI endpoint is configured to enable two functions. Each function is identified by a function identifier, which is provided in bits [63:62] of the address. The configurable port may place the function identifier in the outgoing PCI transaction, for example in the requester identifier field. In the second example, the PCI endpoint is configured to enable virtualization. With virtualization enabled, the PCI endpoint may enable any number of virtual functions (in this case, 256) for each of two physical functions. Each physical function (PF) is identified by a PF identifier, provided in bits [63:62] of the address. A virtual machine identifier is also provided, in bits [61:54], to identify the target virtual machine. Typically, a virtual machine is assigned to a virtual function, hence the virtual machine identifier may also be thought of as a virtual function identifier. In the third example, virtualization is enabled, and so are Transaction Layer Packet (TLP) processing hints (TPH). TPH attributes provide information to the recipient of the transaction to assist the recipient in possibly processing the transaction more quickly. In this example, TPH attributes are provided in bits [63:50] of the address.

TABLE 1

Example Attribute Configurations

| Device Configuration | Address Format |
|---|---|
| Two functions. | [61:00] Address |
|  | [63:62] Function Identifier |
| Virtualization enabled: with two physical functions and 256 virtual functions for each physical function. | [53:00] Address |
|  | [61:54] Virtual Machine Identifier |
|  | [63:62] PF identifier |
| Virtualization enabled with two physical functions and 256 virtual functions for eachphysical function, plus 4-bit Transaction Layer Processing Hints (TPH). | [49:00] Address |
|  | [63:50] [PH Attributes |
|  | [611:54] Virtual Machine Identifier |
|  | [63:62] PF identifier |

The encoding of attributes into the internal transactions produced by the functions 346, 348 may be configured in any of several ways. For example, in one implementation, the configurable port 344 may be configured to detect information provided by the processors 302, or some other entity. For example, the configurable port 344 may watch for configuration transactions sent during a configuration phase of the computing system 300. The configurable port 344 may use the detected information to determine how the PCI endpoint 310 should be configured. The configurable port 344 may further communicate with and configure the functions 346, 348. In other implementations, the PCI endpoint 310 may include a configuration management module 360. The configuration management module 360 may monitor transactions seen at the configurable port 344 and detect information provided, for example, during configuration of the computing system 300. The configuration management module 360 may use the detected information to configure both the configurable port 344 and the functions 346, 348. In yet other implementations, the processors 302 may transmit configuration information to the PCI endpoint 310. This configuration information may configure both the configurable port 344 and the functions 346, 348.

Encoding attributes into internal transactions provides several advantages. First, the PCI endpoint 310 may not require a secondary or sideband interconnect to transfer attributes from the functions 346, 348 to the configurable port 344. This may simplify the design of the PCI endpoint 310, for example, by allowing the PCI endpoint 310 to use a standard bus protocol for the internal interconnect 352. Second, the same PCI endpoint 310 may be configured differently for different situations, without require additional hardware. For example, in one situation, the PCI endpoint 310 may be configured to provide two functions and no virtualization support, while in another situation the same PCI endpoint 310 may provide virtualization and 256 virtual functions for each physical function. Third, the configurable port may provide a flexible hardware implementation. In such implementations, the configurable port may be modified (for example, by updating its firmware) to accommodate changes in the PCI protocols, and/or to provide new or different functionality at the port. The hardware, however, need not be changed, and so the device may continue to be used even as the PCI standard changes. This would be the case for all devices that include a configurable port.

Figure 4:
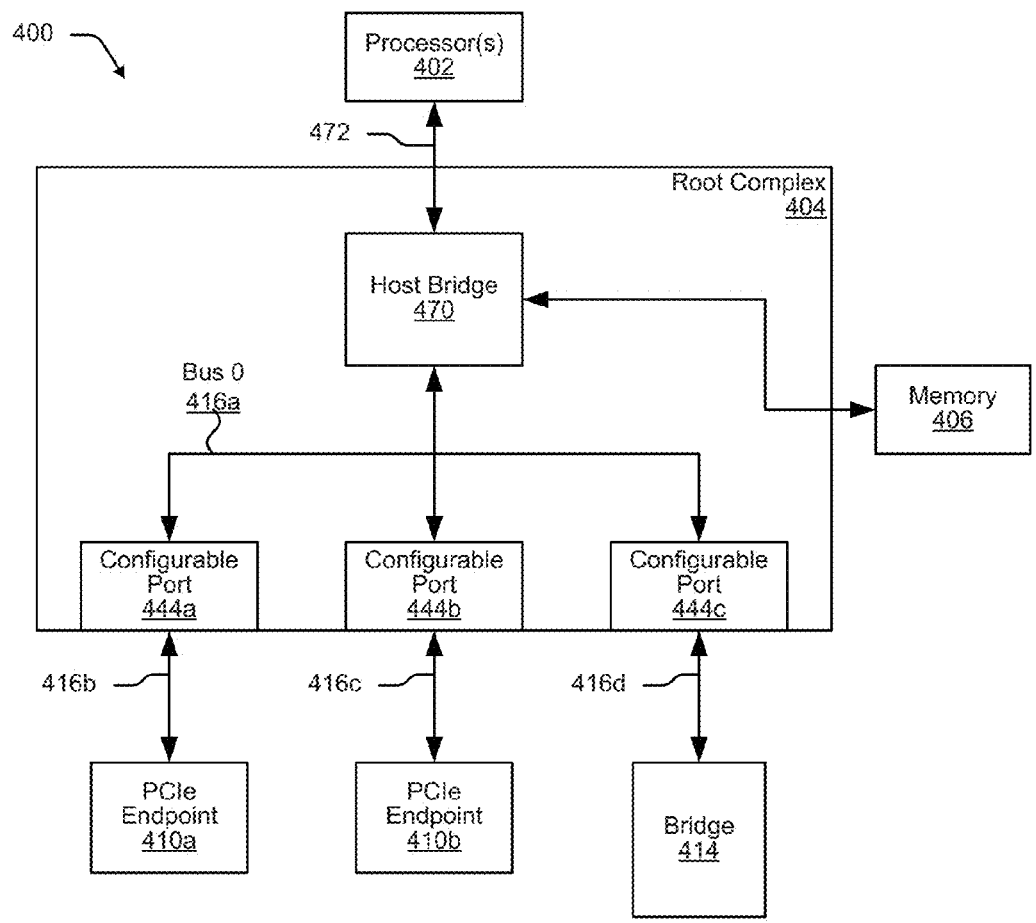
FIG. 4 illustrates an example of a computing system that includes configurable ports implemented in a root complex.

A configurable port may be used in any application where a device communicates with a PCI fabric, or some other protocol used by a computing system to communicate with peripheral devices. FIG. 4 illustrates an example of a computing system 400 that includes configurable ports 444a-c implemented in a root complex 404. The root complex 404 may be in communication with one or more processors 402 and a memory subsystem 406. The root complex 404 may include one or more ports 444a-c. These ports 444a-c may be connected to PCI switches, bridges 414, and/or endpoints 410a-b using a PCI interconnects 416b-d.

The root complex 404 in this example further includes a host bridge 470. The processors 402 may communicate over a processor interconnect 472 that implements a processor bus protocol. The host bridge 470 may translate between the processor bus protocol and the PCI protocol, and route translated transactions, over an internal bus 416a to one of the configurable ports 444a-c. Similarly, the host bridge 470 may translate PCI transactions received by the configurable ports 444a-c into transactions that can be transmitted over the processor interconnect 472 to the processors 402. In other implementations, the computing system 400 may include more than one processor or group of processors. In these implementations, the root complex 404 may include more than one host bridge 470, or may include more than one root complex 404. In some implementations, the host bridge 470 may provide communication with the memory subsystem 406.

In this example, the processors 402 may generate transactions targeting one or more PCI endpoints. Software executing on the processors 402 may be configured to encode attributes into these processor transactions. This would, for example, allow the processors 402 to transfer attributes to the root complex without needing to add extra wires or a secondary interconnect to the processor interconnect 472. In most cases, the attributes are not likely to interfere with the host bridge's 470 translation of the processor transactions, because the attributes are encoding into existing parts of the transaction (for example, in bits of the address). The host bridge 470 may thus pass the attributes down to a configurable port 444b in the internal transaction that is transferred over the internal bus 416a.

Each of the configurable ports 444a-c may be configured to extract attributes from internal transactions received over the internal bus 416a. For example, the configurable port 444b may receive an internal transaction over the internal bus 416a that includes one or more attributes. The configurable ports 444b may remove the attributes from the internal transaction, and generate an outgoing PCI transaction using the internal transaction and the extracted attributes. In some cases, the internal transaction does not require additional translation before it can be transmitted over a PCI interconnect 416c.

The configurable ports 444a-c may also operate in the reverse direction. For example, the configurable port 444b may receive a transaction over a PCI interconnect 416c. This inbound transaction may include one or more attributes. The configurable port 444b may remove the attributes from the inbound transaction, and place them into the designated bits in an internal transaction. The configurable port 444b may further direct the internal transaction to the host bridge 470 to transfer to the processors 402.

Figure 5:
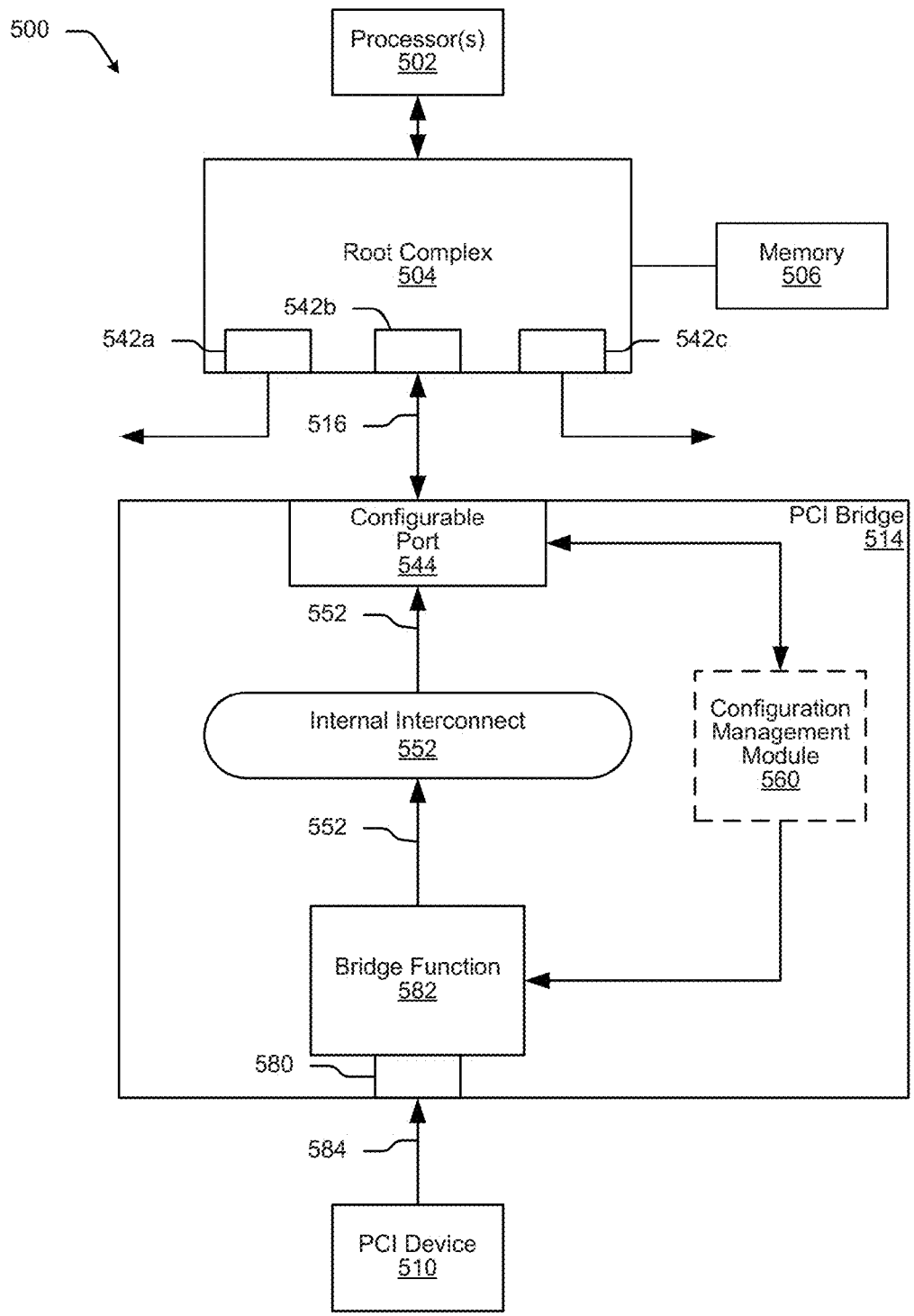
FIG. 5 illustrates another example of a computing system that includes a configurable port, here implemented in a PCI bridge.

FIG. 5 illustrates another example of a computing system 500 that includes a configurable port 544, here implemented in a PCI bridge 514. In this example, the PCI bridge 514 is in communication with a PCI device 510, and provides a bridge function 582 to connect the PCI device 510 to the computing system 500. In some implementations, the PCI bridge 514 may also include an optional configuration management module 560.

The PCI bridge 514 is also in communication with a root complex 504, over a PCI interconnect 516. The root complex 504 may be in communication with one or more processors 502 and a memory subsystem 506. The root complex 504 may include one or more ports 542a-c. These ports 542a-c may be connected, using additional PCI interconnects, to PCI switches, bridges, and endpoints, including the illustrated PCI bridge 514. The root complex 504 may route transactions between the processors 502 and any of the endpoints, switches, or bridges, or between the endpoints, switches, and bridges themselves. In this example, PCI is used as an example of a bus protocol that may be implemented by a computing system to connect to peripheral devices. It is understood that the example illustrated in FIG. 5 may apply to other bus protocols that may be used to connect peripheral devices to a computing system.

The processors 502 may be general purpose computing devices that are generally capable of executing software code. A processor may include multiple processing cores. The memory subsystem 506 provides temporary or long-term storage for data that may be used by the computing system 500.

The PCI bridge 514 in this example includes a configurable port 544, a bridge function 582, and an internal interconnect 552 that connects the bridge function 582 to the configurable port 544. The PCI bridge 514 may communicate with a downstream PCI device 510 over a downstream interconnect 584. The PCI bridge 514 may include a downstream port 580 to connect to the downstream interconnect 584. The downstream PCI device 510 may be a PCIe device, or may be a legacy endpoint that implements PCI or PCI-X. In implementations where the downstream PCI device 510 is a legacy endpoint, the downstream interconnect 584 may implement a compatible legacy PCI protocol. In some implementations, the PCI bridge 514 may include a configuration management module 560. The configuration management module 560 may monitor transactions seen at the configurable port 544 and detect information provided, for example, during configuration of the computing system 500. The configuration management module 560 may, in some cases, provide configuration information. In some cases, the configuration management module 560 may manage configuration of the configurable port 544 and/or the bridge function 582.

The configurable port 544 may include a physical interface for connecting to a cable, socket, port, or other connection to the PCI interconnect 516. The configurable port 544 may further include hardware and/or software to manage incoming and outgoing transactions. The configurable port 544 may translate an internal transaction generated by the bridge function 582 into a PCI transaction that will be transmitted over the PCI interconnect 516. The configurable port 544 may further translate inbound transactions received over the PCI interconnect 516 for transfer over the internal interconnect 552 to the bridge function 582.

The bridge function 582 may provide an interface between the downstream PCI device 510 and the internal interconnect 552. The bridge function 582 may provide, for example, translation between the protocol implemented on the downstream interconnect 584 and the protocol implemented on internal interconnect 552. The bridge function 582 may further include its own configuration space. Configuration registers in this configuration space may control the operation of the bridge function 582, and/or may provide information about the bridge function 582. In some cases, the configuration space may also include configuration registers that control the operation of the downstream PCI device 510.

In this example, transactions may originate from the downstream PCI device 510. An original transaction from the downstream PCI device 510 may be transferred over the downstream interconnect 584 to the PCI bridge's 514 downstream port 580. The downstream port 580 may hand the original transaction over to the bridge function 582. The bridge function 582 may translate the original transaction into an internal transaction that can be transferred over the internal interconnect 552. The bridge function 582 may also be configured to add transaction attributes to the internal transaction. These attributes may be encoded into the internal transaction, for example in the address bits. These attributes may include information such as a function identifier, a virtual machine identifier, no snoop, relaxed ordering, cacheability, and/or processing hints.

The configurable port 544 may, upon receiving the internal transaction over the internal interconnect 552, extract the attributes from the transaction. The configurable port 544 may also remove the attribute bits from the internal transaction. The configurable port 544 may then generate a PCI transaction using the information provided by the internal transaction and the extracted attributes. In some cases, removing the attributes is unnecessary, and an outgoing PCI transaction can be generated from the internal transaction as it was received by the configurable port 544. In many cases, a PCI transaction may include fields for one or more of the attributes, such as for example a requester identifier field, or an attribute field.

The configurable port 544 may also operate in the reverse direction. Upon receiving a transaction over the PCI interconnect 516, the configurable port 544 may place any attributes received with the inbound PCI transaction into the designated bits in an internal transaction. These attributes may be used by the bridge function 582, for example to decode and accept the internal transaction.

Providing a configurable port in a PCI bridge may provide several advantages. First, the PCI bridge 514 can be configured to bridge to any PCI device. Furthermore, any PCI device can be made to behave and appear as a different PCI device. For example, a legacy PCI endpoint can be made to appear, to the computing system 500, as a PCIe device. Alternatively, a legacy PCI endpoint can be made to appear and behave like an SR-IOV-capable device, meaning a PCI endpoint that does not otherwise support virtualization can be made to appear to the computing system as if it does support virtualization. A PCI bridge as illustrated in FIG. 5 thus provides a system to connect any PCI device to a PCI interconnect.

Figure 6:
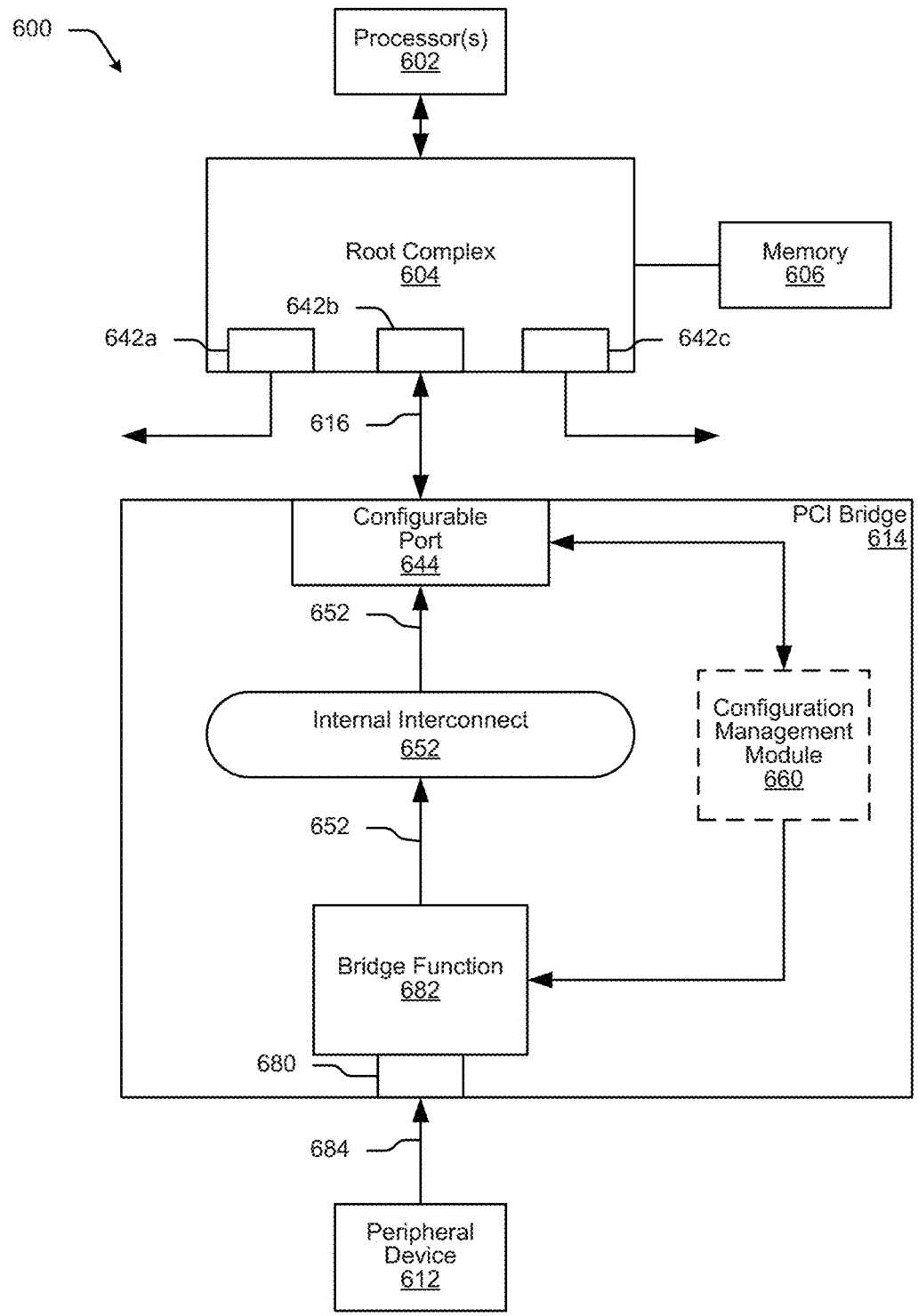
FIG. 6 illustrates another example of a computing system that includes a configurable port, here implemented in a PCI bridge.

FIG. 6 illustrates another example of a computing system 600 that includes a configurable port 644, here implemented in a PCI bridge 614. In this example, the PCI bridge 614 is in communication with a peripheral device 612, which in this example is a generic, non-PCI peripheral device. The PCI bridge 614 provides a bridge function 682 to connect the peripheral device 612 to the computing system 600. In some implementations, the PCI bridge 614 may also include an optional configuration management module 660.

The PCI bridge 614 is also in communication with a root complex 604, over a PCI interconnect 616. The root complex 604 may be in communication with one or more processors 602 and a memory subsystem 606. The root complex 604 may include one or more ports 642a-c. These ports 642a-c may be connected, using additional PCI interconnects, to PCI switches, bridges, and endpoints, including the illustrated PCI bridge 614. The root complex 604 may route transactions between the processors 602 and any of the endpoints, switches, or bridges, or between the endpoints, switches, and bridges themselves. In this example, PCI is used as an example of a bus protocol that may be implemented by a computing system to connect to peripheral devices. It is understood that the example illustrated in FIG. 6 may apply to other bus protocols that may be used to connect peripheral devices to a computing system.

The processors 602 may be general purpose computing devices that are generally capable of executing software code. A processor may include multiple processing cores. The memory subsystem 606 provides temporary or long-term storage for data that may be used by the computing system 600.

The PCI bridge 614 in this example includes a configurable port 644, a bridge function 682, and an internal interconnect 652 that connects the bridge function 682 to the configurable port 644. The PCI bridge 614 may communicate with a downstream peripheral device 612 over a downstream interconnect 684. The PCI bridge 614 may include a downstream port 680 to connect to the downstream interconnect 684. The downstream peripheral device 612 may be any non-PCI peripheral device, meaning that the peripheral device may communicate with the computing system 600 using a bus protocol other than any of the PCI protocols. The downstream interconnect 684 may implement a non-PCI bus protocol that is compatible with the protocol implemented by the peripheral device 612.

The configurable port 644 may include a physical interface for connecting to a cable, socket, port, or other connection to the PCI interconnect 616. The configurable port 644 may further include hardware and/or software to manage incoming and outgoing transactions. The configurable port 644 may translate an internal transaction generated by the bridge function 682 into a PCI transaction that will be transmitted over the PCI interconnect 616. The configurable port 644 may further translate inbound transactions received over the PCI interconnect 616 for transfer over the internal interconnect 652 to the bridge function 682.

The bridge function 682 may provide an interface between the downstream peripheral device 612 and the internal interconnect 652. The bridge function 682 may provide, for example, translation between the protocol implemented on the downstream interconnect 684 and the protocol implemented on the internal interconnect 652. The bridge function 682 may further include its own configuration space. Configuration registers in this configuration space may control the operation of the bridge function 682 and/or may provide information about the bridge function 682. In some cases, the configuration space may also include configuration registers that control the operation of the downstream peripheral device 612.

In this example, transactions may originate from the downstream peripheral device 612. An original transaction from the downstream peripheral device 612 may be transferred over the downstream interconnect 684 to the PCI bridge's 614 downstream port 680. The downstream port 680 may hand the original transaction over to the bridge function 682. The bridge function 682 may translate the original transaction into an internal transaction that can be transferred over the internal interconnect 652. The bridge function 682 may also be configured to add transaction attributes to the internal transaction. These attributes may be encoded into the internal transaction, for example in the address bits. These attributes may include information such as a function identifier, a virtual machine identifier, no snoop, relaxed ordering, cacheability, and/or processing hints.

The configurable port 644 may, upon receiving the internal transaction over the internal interconnect 652, extract the attributes from the transaction. The configurable port 644 may also remove the attribute bits from the transaction. The configurable port 644 may then generate a PCI transaction using the information provided by the internal transaction and the extracted attributes. In some cases, removing the attributes is unnecessary, and an outgoing PCI transaction can be generated from the transaction as it was received by the configurable port 644. In many cases, a PCI transaction may include fields for each of the attributes, such as for example a requester identifier field, or an attribute field.

The configurable port 644 may also operate in the reverse direction. Upon receiving a transaction over the PCI interconnect 616, the configurable port 644 may place any attributes received with the inbound PCI transaction into the designated bits in an internal transaction. These attributes may be used by the bridge function 682, for example to decode and accept the internal transaction.

Providing a configurable port in a PCI bridge may provide several advantages. First, the PCI bridge can be configured to bridge to any peripheral device. In this way, any non-PCI peripheral device can be made to appear, to a computing system, as a PCI device. Furthermore, the PCI bridge can be configured to present capabilities that the peripheral device 612 alone does not have. For example, the peripheral device can be made to appear and behave like an SR-IOV-capable device, meaning the peripheral device may appear to support virtualization. A PCI bridge as illustrated in FIG. 6 thus provides a system to connect any peripheral device to a PCI interconnect.

II. Methods

Figure 7:
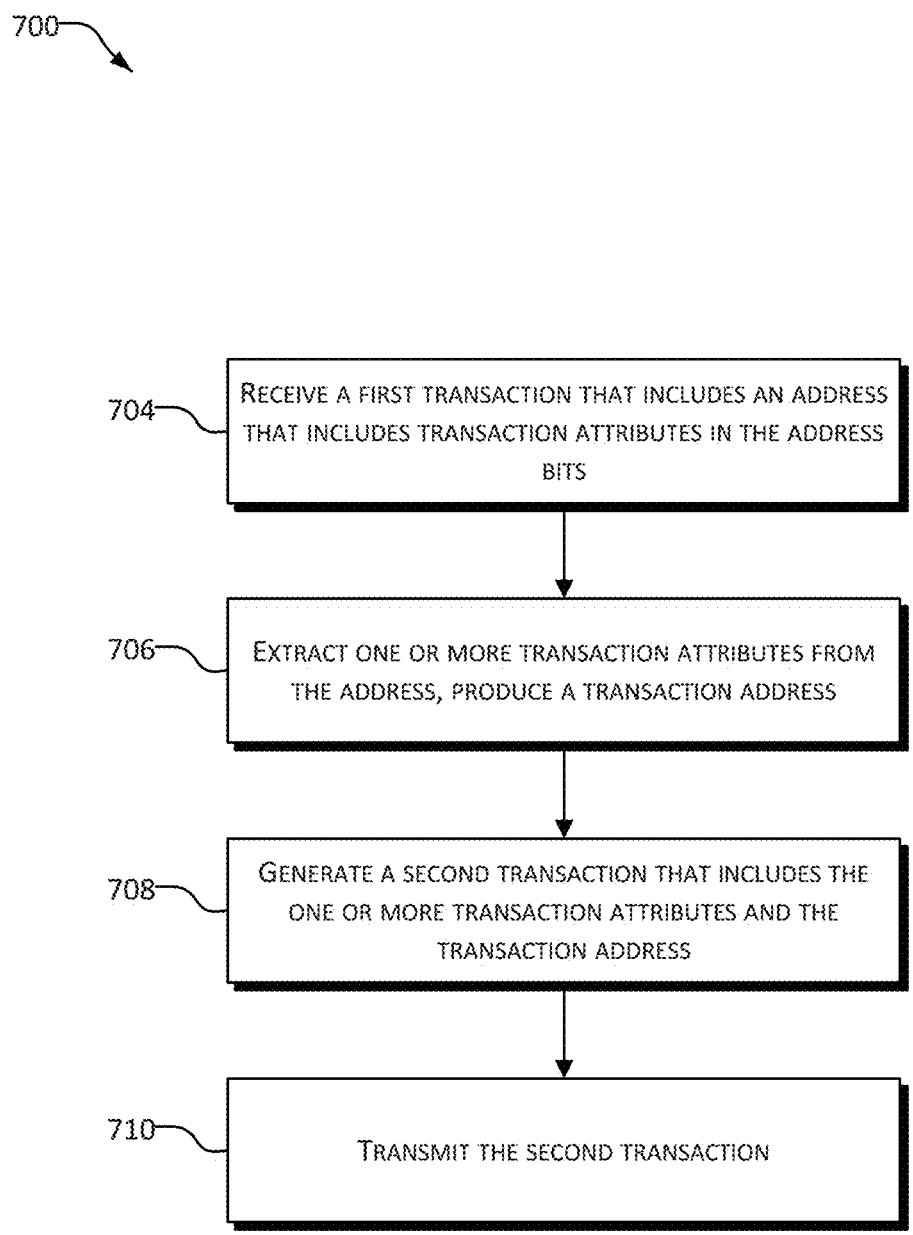
FIG. 7 illustrates one example of a process for encoding transaction attributes into an internal transaction and generating a PCI transaction.
Figure 8:
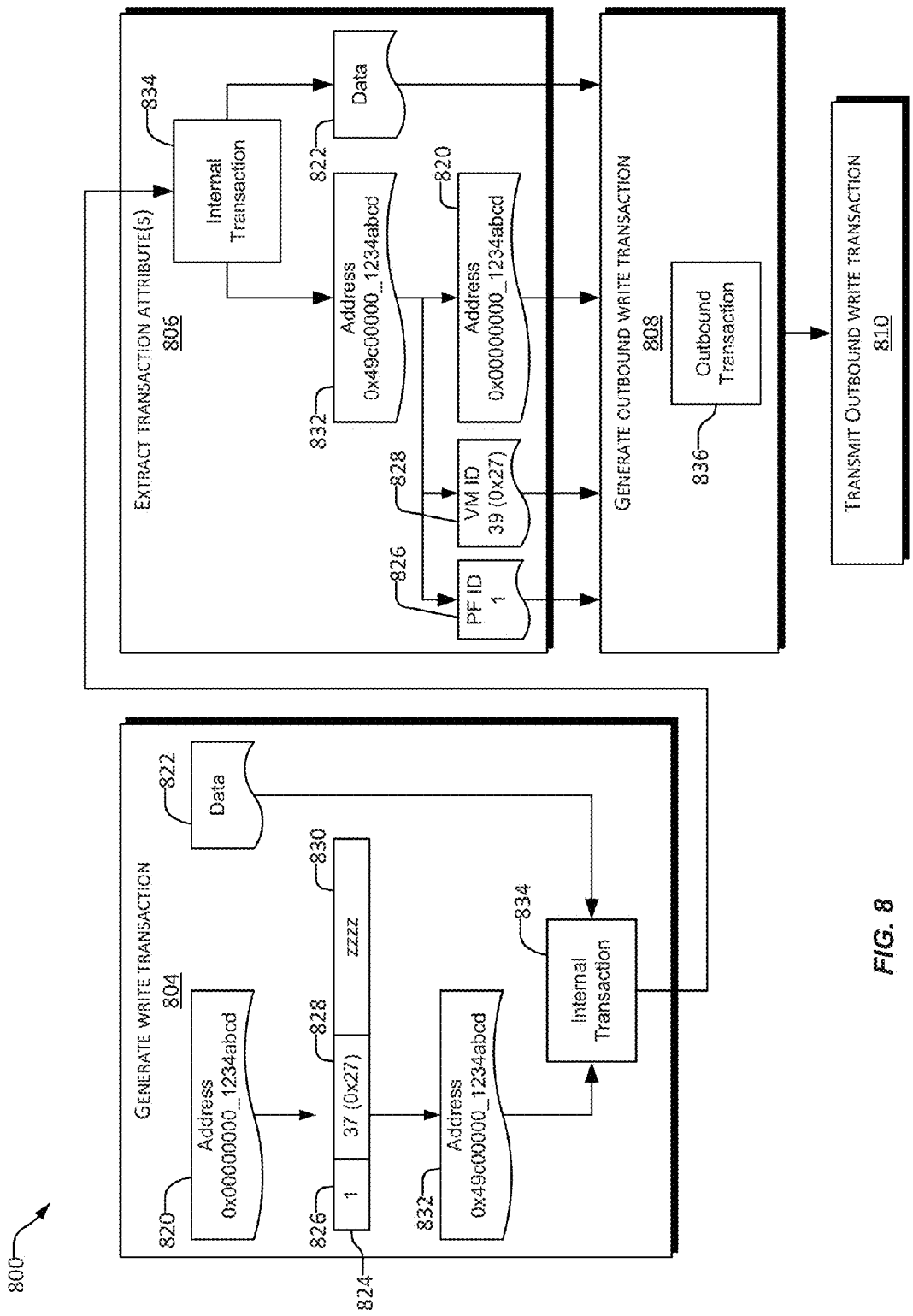
FIG. 8 illustrates in greater detail an example of a process for encoding transaction attributes into an internal transaction and generating an outbound transaction.

FIGS. 7-8 illustrate examples of processes for encoding transaction attributes into an internal transaction, and generating PCI transactions with those attributes. The illustrated processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 7 illustrates one example of a process 700 for encoding transaction attributes into an internal transaction and generating a PCI transaction. The process 700 may be executed by a peripheral device, such as a PCI endpoint, or another PCI device, such as root complex or bridge or a similar device.

At step 704, the peripheral device may receive a first transaction that includes an address. The address may include one or more transaction attributes in the bits of the address. In some implementations, these bits would ordinarily be set to zero. Transaction attributes provide additional information about a transaction that is generated by a function. An attribute may, for example, identify the requester of the transaction, may indicate how the transaction should be handled by the recipient, and/or may provide hints to assist in faster processing of the transaction. The first transaction may include other information, such as a transaction type (e.g., read or write) and possibly transaction data. In some implementations, the first transaction may be transmitted according to an internal bus protocol, where the internal bus protocol may be used by the peripheral device for internal transfer of transactions from the functions.

At step 706, the peripheral device may extract one or more transaction attributes from the address, and produce a transaction address. This step may involve a configurable port. The configurable port may be configured to extract transaction attributes from the bits of the address included with the transaction. The configurable port may further be configured to produce a transaction address. In some implementations, this may include removing the attribute bits from the address. In other implementations, the address can be used without removing the attribute bits.

At step 708, the peripheral device may generate a second transaction that includes the one or more transaction attributes and the transaction address produced at step 706. The second transaction may be a generated according to an external bus protocol. The second transaction may be generated by a configurable port. The configurable port may translate the first transaction from an internal bus protocol to an external bus protocol to produce the second transaction.

At step 710, the peripheral device may transmit the second transaction. The second transaction may be transmitted according to a standard bus protocol. In some implementations, the standard bus protocol may be different from the internal bus protocol.

In some implementations, the peripheral device may include a host bridge. In these implementations, the first transaction may be received from the host bridge. In some cases, a peripheral device that includes a host bridge may be a root complex. In other implementations, the peripheral device may include a second port. In these implementations, the first transaction may be received over the second port. In some cases, a peripheral device that includes a second port may be a bridge device.

FIG. 8 illustrates in greater detail an example of a process 800 for encoding transaction attributes into an internal transaction and generating an outbound transaction. The process 800 may be executed by a peripheral device, such as a PCI endpoint, or another PCI device, such as a root complex or bridge.

The process 800 illustrates, as an example, how a write transaction may be generated by a function, and how that write transaction may be processed by a configurable port to produce an outbound transaction. This process 800 also generally applies to read transactions, though a write transaction is specifically described in order to provide context.

At step 804, the write transaction is generated by a function. The write transaction includes an address 820 and data 822. The data 822 is to be written at the location specified by the address 820. In this example, the address field is 64 bits, but only 32 bits are needed. Hence, the upper 32 bits are zero.

The function may also include a configuration register 824. The configuration register 824 may specify one or more transaction attributes to include in the transaction. The configuration register 824 may further describe where the attributes are to be placed in the transaction. In this example, the configuration register 824 indicates that bits [63:62] of the address 820 are to be used to specify a physical function identifier 826. In this example, the function's physical function identifier 826 is "1." The configuration register 824 further indicates that bits [61:54] of the address 820 are to be used to specify a virtual machine identifier 828. In this example, the virtual machine identifier 828 is 37 (represented as hexadecimal value 0x27). The configuration register 824 further indicates that the remaining bits 830 (bits [53:0]) are to include the bits from the original address 820.

When generating the write transaction, the address 820 may be combined with the information provided by the configuration register 824. The resulting address 832 now includes both the bits from the original address 820 as well as the physical function identifier 826 and the virtual machine identifier 828. The resulting address 832 and the data 822 are both included in an internal transaction 834. This internal transaction 834 is transmitted, using an interconnect that is internal to the peripheral device, to the configurable port.

At step 806, the configurable port may extract transaction attributes from the internal transaction 834. The internal transaction 834 includes at least the address 832 constructed at the function, and the data 822 to be written. The configurable port may be programmed with the encoding of the address 832. The configurable port thus may know to extract the physical function identifier 826 (PF ID) from bits [63:62] and the virtual machine identifier 828 (VM ID) from bits [61:54]. The configurable port may also know that the remaining bits are the original address 820.

Each of the attributes 826, 828, the address 820, and the data 822 may continue to step 808. At step 808, an outbound write transaction 836 is generated. At this step 808, the attributes 826, 828 may be placed in their designated fields in the outbound transaction 836. For example, the outbound transaction 836 may be 96 bits in size, and the physical function identifier 826 may be placed at bits [41:40]. Furthermore, the virtual machine identifier 828 may be placed at bits [39:32]. The size of the outbound transaction 836 and the placement of the attributes 826, 828 within the outbound transaction 836 may be determined by the external bus protocol. The address 820 may also be placed at its designated location in the outbound transaction 836, such as for example at bits [64:95]. The data 822 will also be attached to the outbound transaction 836. At step 810, the outbound transaction 836, including the data 822, the address 820, and the transaction attributes 826, 828, may be transmitted.

III. Computing Systems

Figure 9:
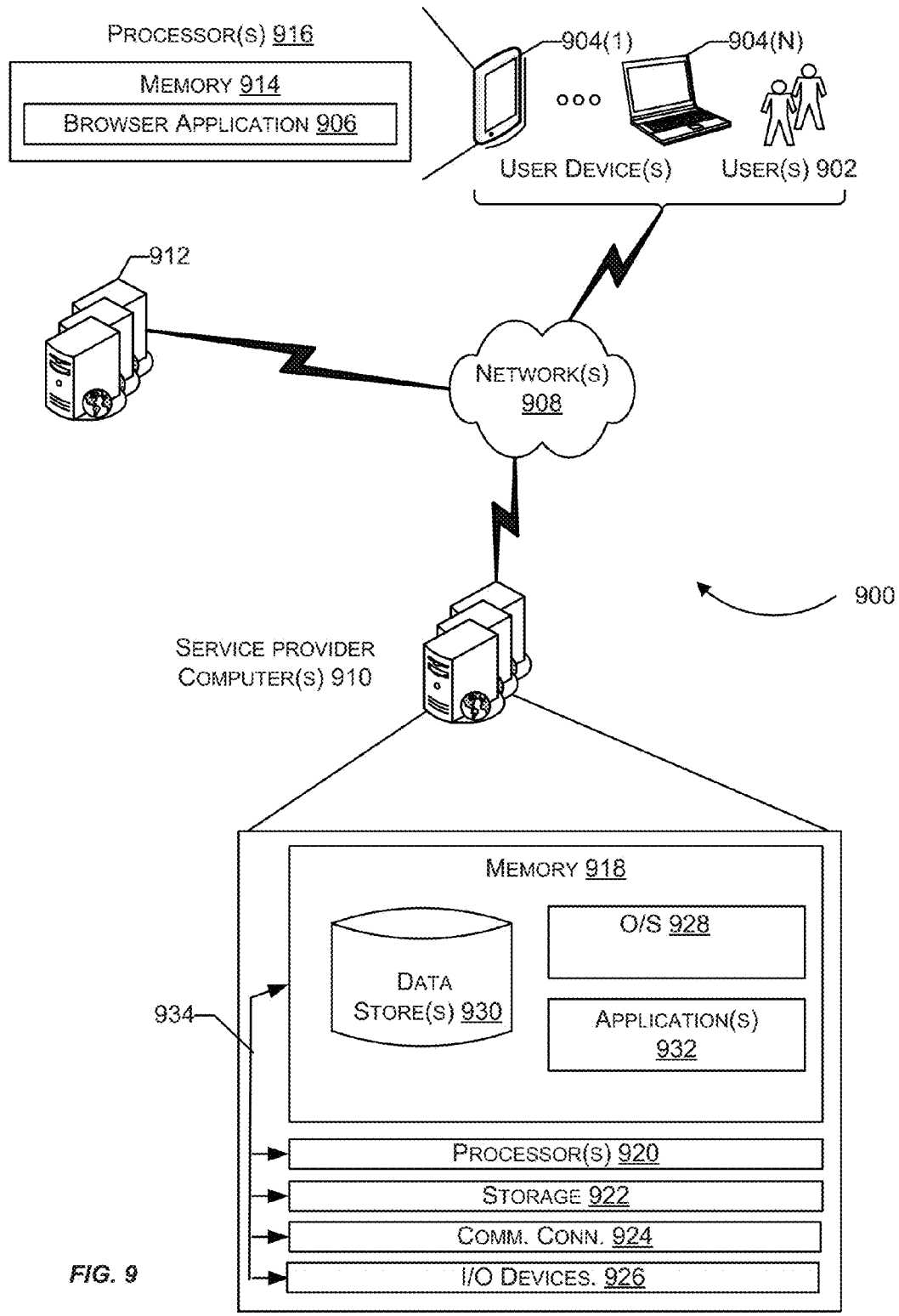
FIG. 9 illustrates an example architecture for features and systems described herein that includes one or more service provider computers and/or a user device connected via one or more networks, according to some embodiments.

FIG. 9 illustrates an example architecture for features and systems described herein that includes one or more service provider computers and/or a user device connected via one or more networks. The devices discussed in FIGS. 2-6 may use one or more components of the computing devices described in FIG. 9 or may represent one or more computing devices described in FIG. 9. In the illustrated architecture 900, one or more users 902 may use user computing devices 904(1)-(N) to access an application 906 (e.g., a web browser or mobile device application), via one or more networks 908. In some aspects, the application 906 may be hosted, managed, and/or provided by a computing resources service or service provider. One or more service provider computers 910 may provide a native application that is configured to run on the user devices 904, which user(s) 902 may interact with. The service provider computer(s) 910 may, in some examples, provide computing resources such as, but not limited to, client entities, low latency data storage, durable data storage, data access, management, virtualization, cloud-based software solutions, electronic content performance management, and so on. The service provider computer(s) 910 may also be operable to provide web hosting, computer application development and/or implementation platforms, combinations of the foregoing or the like to the user(s) 902. The service provider computer(s) 910, in some examples, may communicate with one or more third party computers 912.

In some examples, network(s) 908 may include any one or a combination of many different types of networks, such as cable networks, the Internet, wireless networks, cellular networks and other private and/or public networks. While the illustrated example represents the user(s) 902 accessing an application 906 over the network(s) 908, the described techniques may equally apply in instances where the user(s) 902 interact with the service provider computer(s) 910 via user device(s) 904 over a landline phone, via a kiosk or in some other manner. The described techniques may also apply in other client/server arrangements (e.g., set-top boxes, etc.), as well as in non-client/server arrangements (e.g., locally stored applications, etc.).

As described briefly above, the application 906 may allow the user(s) 902 to interact with the service provider computer(s) 910 to, for example, access web content (e.g., web pages, music, video, etc.). The service provider computer(s) 910, which may be arranged in a cluster of servers or as a server farm, may host the application 906 and/or cloud-based software services. Other server architectures may also be used to host the application 906. The application 906 may be capable of handling requests from many users 902 and serving, in response, various item web pages. The application 906 can provide any type of website that supports user interaction, including social networking sites, online retailers, informational sites, blog sites, search engine sites, news and entertainment sites, and so forth. As discussed above, the described techniques can similarly be implemented outside of the application 906, such as with other applications running on the user device(s) 904.

The user device(s) 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 904 may be in communication with the service provider computer(s) 910 via the network(s) 908, or via other network connections. Additionally, the user device(s) 904 may be part of the distributed system managed by, controlled by, or otherwise part of the service provider computer(s) 910 (e.g., a console device integrated with the service provider computers 910).

In one illustrative configuration, a user device(s) 904 may include at least one memory 914 and one or more processing units (or processor(s) 916). The processor(s) 916 may be implemented in hardware, computer-executable instructions, firmware, or combinations thereof. Computer-executable instruction or firmware implementations of the processor(s) 916 may include computer-executable or machine-executable instructions written in any suitable programming language to perform the various functions described. The user device(s) 904 may also include geo-location devices (e.g., a global positioning system (GPS) device or the like) for providing and/or recording geographic location information associated with the user device(s) 904.

The memory 914 may store program instructions that are loadable and executable on the processor(s) 916, as well as data generated during the execution of these programs. Depending on the configuration and type of the user device(s) 904, the memory 914 may be volatile (such as random access memory (RAM)) and/or non-volatile (such as read-only memory (ROM), flash memory, etc.). The user device(s) 904 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, the memory 914 may include multiple different types of memory, such as static random access memory (SRAM), dynamic random access memory (DRAM), or ROM.

Turning to the contents of the memory 914 in more detail, the memory 914 may include an operating system and one or more application programs or services for implementing the features disclosed herein including at least a user provided input element or electronic service web page, such as via a browser application 906 or dedicated applications (e.g., smart phone applications, tablet applications, etc.). The browser application 906 may be configured to receive, store and/or display a website or other interface for interacting with the service provider computer(s) 910. Additionally, the memory 914 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 904.

In some aspects, the service provider computer(s) 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 910 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 910 may be in communication with the user device(s) 904 and/or other service providers via the network(s) 908, or via other network connections. The service provider computer(s) 910 may include one or more servers, perhaps arranged in a cluster, as a server farm, or as individual servers not associated with one another. These servers may be configured as part of an integrated, distributed computing environment.

In one illustrative configuration, the service provider computer(s) 910 may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the service provider computer(s) 910, the memory 918 may be volatile (such as RAM) and/or non-volatile (such as ROM, flash memory, etc.). The service provider computer(s) 910 or servers may also include additional storage 922, which may include removable storage and/or non-removable storage. The additional storage 922 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918, the additional storage 922, both removable and non-removable are all examples of computer-readable storage media. For example, computer-readable storage media may include volatile or non-volatile, removable or non-removable media implemented in any method or technology for storage of information such as computer-readable instructions, data structures, program modules, or other data. The memory 918 and the additional storage 922 are all examples of computer storage media. Additional types of computer storage media that may be present in the service provider computer(s) 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 910. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 910 may also contain communications connection(s) 924 that allow the service provider computer(s) 910 to communicate with a stored database, another computing device or server, user terminals and/or other devices on the network(s) 908. The service provider computer(s) 910 may also include I/O device(s) 926, such as a keyboard, a mouse, a pen, a voice input device, a touch input device, a display, speakers, a printer, and the like. The communication connection(s) 924 and I/O device(s) 926, along with the storage 922, may be described as peripheral devices.

The memory 918 may include an operating system 928, one or more data stores 930 and/or one or more application programs 932 or services for implementing the features disclosed herein.

The service provider computer(s) 910 may also include one or more communication channels 934. A communication channel 934 may provide a medium over which the various components of the service provider computer 910 can communicate. The communication channel or channels 934 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

Figure 10:
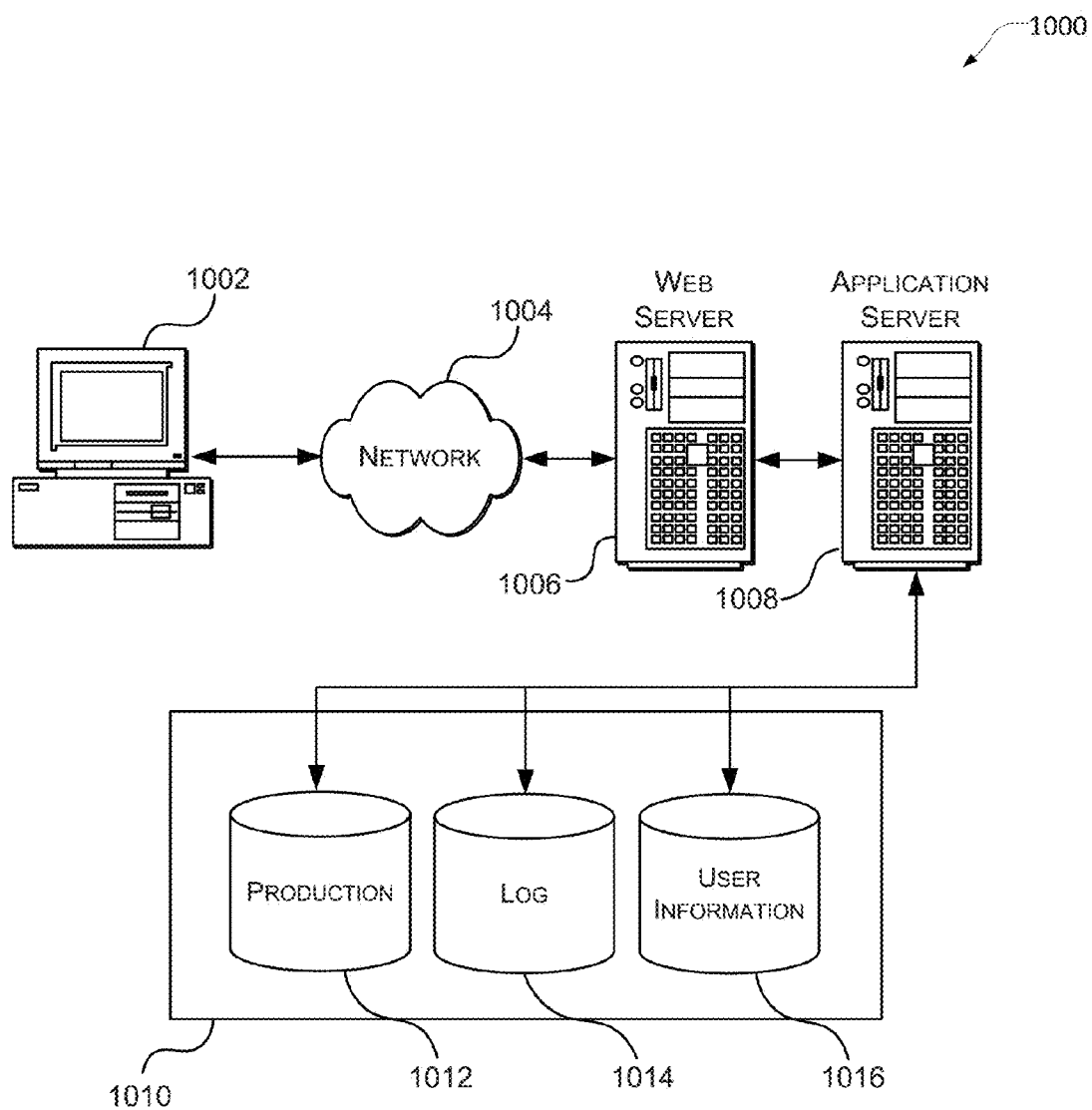
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A PCI device comprising: a function, wherein the function provides operative functionality to the PCI device, wherein the function is configured to generate an internal transaction, wherein the internal transaction is associated with an address and an attribute, wherein the attribute provides information about the internal transaction, and wherein the internal transaction includes an address field;
a configuration register, wherein the configuration register is associated with the function, wherein the configuration register controls placement of the attribute in the internal transaction, and wherein, based on the configuration register, the address field includes the address in a first set of bits of the address field and the attribute in a second set of bits of the address field;
and a configurable port, wherein the configurable port is configured to:
receive the internal transaction; extract the attribute and the address from the address field;
generate a PCI transaction, wherein the PCI transaction includes the attribute in a first field of the PCI transaction and includes the address in a second field of the PCI transaction, wherein the first field and the second field are different fields of the PCI transaction; and
transmit the PCI transaction from the PCI device over a PCI interconnect.

2. The PCI device of claim 1, further comprising:
an internal interconnect, wherein the internal interconnect is configured to transport the internal transaction from the function to the configurable port.

3. The PCI device of claim 2, wherein the internal interconnect is configured to implement a protocol, wherein the protocol is different from a PCI protocol.

4. The PCI device of claim 1, wherein the attribute includes a function number, a device number, a bus number, a virtual machine identifier, a transaction layer packet processing hint, or a cacheability indicator.

5. A peripheral device comprising:
a configurable port, wherein the configurable port is configured to:
receive an internal transaction, wherein the internal transaction is received from another component of the peripheral device, wherein the internal transaction includes an address field, wherein the address field includes an address associated with the internal transaction and an attribute associated with the internal transaction, wherein the attribute provides information about the internal transaction, and wherein the address field includes the address in a first set of bits of the address field and the attribute in a second set of bits of the address field;
extract the attribute and the address from the address field;
generate an outbound transaction that includes the attribute in a first field of the outbound transaction and includes the address in a second field of the outbound transaction, wherein the first field and the second field are different fields of the outbound transaction; and
transmit the outbound transaction from the peripheral device.

6. The peripheral device of claim 5, further comprising:
a function, wherein the function provides operative functionality to the peripheral device, and wherein the function is configured to generate the internal transaction.

7. The peripheral device of claim 6, wherein the function is one of two or more functions of the peripheral device.

8. The peripheral device of claim 6, wherein the function is a physical function, and wherein the peripheral device further comprises:
one or more virtual functions, wherein the one or more virtual functions are associated with the physical function.

9. The peripheral device of claim 5, further comprising:
a second port, wherein the second port is configured to connect to another peripheral device, wherein the internal transaction is generated by the second port.

10. The peripheral device of claim 9, wherein the other peripheral device is a PCI device.

11. The peripheral device of claim 5, wherein the outbound transaction is transmitted according to a standard bus protocol.

12. The peripheral device of claim 11, wherein the internal transaction is received according to an internal bus protocol, wherein the internal bus protocol is different from the standard bus protocol.

13. The peripheral device of claim 5, wherein the attribute includes a function number, a device number, a bus number, a virtual machine identifier, a transaction layer packet processing hint, or a cacheability indicator.

14. The peripheral device of claim 5, wherein the peripheral device is a PCI device.

15. A method for generating transactions on a peripheral bus, comprising:
receiving, at a configurable port of a peripheral device, an internal transaction, wherein the configurable port receives the internal transaction from another component of the peripheral device, wherein the internal transaction includes an address field, wherein the address field includes an address associated with the internal transaction and an attribute associated with the internal transaction, wherein the attribute provides information about the internal transaction, and wherein the address field includes the address in a first set of bits of the address field and the attribute in a second set of bits of the address field;

extracting the attribute and the address from the address field;

generating an outbound transaction that includes the attribute in a first field of the outbound transaction and includes the address in a second field of the outbound transaction, wherein the first field and the second field are different fields of the outbound transaction; and transmitting the outbound transaction from the peripheral device.

16. The method of claim 15, wherein the internal transaction is generated by a function of the peripheral device, the peripheral device being an endpoint device.

17. The method of claim 15, further comprising:
receiving, from a second port, the internal transaction, wherein the second port is configured to connect to another peripheral device.

18. The method of claim 15, wherein the outbound transaction is transmitted according to a standard bus protocol.

19. The method of claim 18, wherein the internal transaction is received according to an internal bus protocol, wherein the internal bus protocol is different from the standard bus protocol.

20. The method of claim 15, wherein the attribute includes a function number, a device number, a bus number, a virtual machine identifier, a transaction layer packet processing hint, or a cacheability indicator.

* * * * *